(12) United States Patent
Gupta et al.

(10) Patent No.: US 10,148,893 B2
(45) Date of Patent: *Dec. 4, 2018

(54) METHODS, SYSTEMS, AND MEDIA FOR HIGH DYNAMIC RANGE IMAGING

(71) Applicant: Sony Corporation, Tokyo (JP)

(72) Inventors: Mohit Gupta, New York, NY (US); Tomoo Mitsunaga, Kanagawa (JP); Daisuke Iso, Tokyo (JP); Shree K. Nayar, New York, NY (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,420

(22) Filed: Mar. 7, 2017

(65) Prior Publication Data

US 2017/0230562 A1    Aug. 10, 2017

Related U.S. Application Data

(63) Continuation of application No. 14/652,397, filed as application No. PCT/US2013/072385 on Nov. 27, 2013, now Pat. No. 9,648,248.

(Continued)

(51) Int. Cl.
*H04N 5/235* (2006.01)
*H04N 5/225* (2006.01)
(Continued)

(52) U.S. Cl.
CPC .......... *H04N 5/2355* (2013.01); *G06T 5/007* (2013.01); *G06T 5/50* (2013.01); *G06T 7/20* (2013.01);
(Continued)

(58) Field of Classification Search
CPC .. H04N 5/2355; H04N 5/2258; H04N 5/2352; H04N 5/2356; H04N 5/2353; G06T 5/007; G06T 5/50; G06T 7/20; G06T 2207/10144; G06T 2207/10016; G06T 2207/20208

See application file for complete search history.

(56) References Cited

U.S. PATENT DOCUMENTS 8,797,433 B2   8/2014   Kaizu et al.
8,798,395 B2   8/2014   Jo
(Continued)

OTHER PUBLICATIONS

Adams, A., et al., "Viewfinder Alignment", In Computer Graphics Forum: Proceedings of EUROGRAPHICS 2008, Crete, GR, Apr. 14-18, 2008, vol. 27, No. 2, pp. 597,606.
(Continued)

*Primary Examiner* — Shahbaz Nazrul
(74) *Attorney, Agent, or Firm* — Wolf, Greenfield & Sacks, P.C.

(57) ABSTRACT

Systems, methods, and media for high dynamic range imaging are provided, the systems comprising: an image sensor; and a hardware processor configured to: cause the image sensor to capture first image data having a first exposure time, second image data having a second exposure time, and third image data having a third exposure time that is substantially equal to the sum of the first exposure time and the second exposure time; generate combined image data using the first image data and the second image data.

14 Claims, 6 Drawing Sheets

Related U.S. Application Data

(60) Provisional application No. 61/738,193, filed on Dec. 17, 2012.

(51) Int. Cl.
   G06T 5/00 (2006.01)
   G06T 5/50 (2006.01)
   G06T 7/20 (2017.01)

(52) U.S. Cl.
   CPC ......... H04N 5/2258 (2013.01); H04N 5/2352 (2013.01); H04N 5/2356 (2013.01); *G06T 2207/10016* (2013.01); *G06T 2207/10144* (2013.01); *G06T 2207/20208* (2013.01); *H04N 5/2353* (2013.01)

(56) References Cited

U.S. PATENT DOCUMENTS

| | | |
|---|---|---|
| 8,803,985 B2 | 8/2014 | Kaizu et al. |
| 8,848,063 B2 | 9/2014 | Jo et al. |
| 8,885,978 B2 | 11/2014 | Cote et al. |
| 8,933,924 B2 | 1/2015 | Sato |
| 9,036,060 B2 | 5/2015 | Kaizu et al. |
| 9,060,134 B2 | 6/2015 | Mitsunaga |
| 9,100,514 B2 | 8/2015 | Gu et al. |
| 9,124,809 B2 | 9/2015 | Kaizu et al. |
| 9,131,160 B2 | 9/2015 | Lin et al. |
| 9,344,637 B2 | 5/2016 | Kasai et al. |
| 9,357,137 B2 | 5/2016 | Mitsunaga |
| 2005/0013501 A1 | 1/2005 | Kang et al. |
| 2005/0030315 A1 | 2/2005 | Cohen et al. |
| 2005/0275747 A1 | 12/2005 | Nayar et al. |
| 2006/0133688 A1 | 6/2006 | Kang et al. |
| 2007/0242900 A1 | 10/2007 | Chen et al. |
| 2008/0094486 A1 | 4/2008 | Fuh et al. |
| 2008/0316354 A1* | 12/2008 | Nilehn ............ G06T 5/50 348/362 |
| 2009/0060315 A1 | 3/2009 | Harris et al. |
| 2010/0271512 A1 | 10/2010 | Garten |
| 2011/0211732 A1 | 9/2011 | Rapaport |
| 2012/0105673 A1 | 5/2012 | Morales |
| 2012/0188392 A1 | 7/2012 | Smith |
| 2012/0218426 A1 | 8/2012 | Kaizu et al. |
| 2012/0281111 A1 | 11/2012 | Jo et al. |
| 2012/0287294 A1 | 11/2012 | Kaizu et al. |
| 2012/0314124 A1 | 12/2012 | Kaizu et al. |
| 2013/0033616 A1 | 2/2013 | Kaizu et al. |
| 2013/0050177 A1 | 2/2013 | Sato |
| 2013/0050284 A1 | 2/2013 | Sato |
| 2013/0050520 A1 | 2/2013 | Takeuchi |
| 2013/0051700 A1 | 2/2013 | Jo |
| 2013/0070121 A1 | 3/2013 | Gu et al. |
| 2013/0083226 A1 | 4/2013 | Kwan et al. |
| 2013/0308044 A1 | 11/2013 | Mitsunaga |
| 2013/0329128 A1 | 12/2013 | Kaizu et al. |
| 2014/0192235 A1 | 7/2014 | Hitomi et al. |
| 2014/0192250 A1 | 7/2014 | Mitsunaga |
| 2014/0267828 A1 | 9/2014 | Kasai et al. |
| 2014/0313400 A1 | 10/2014 | Kaizu et al. |
| 2014/0321766 A1 | 10/2014 | Jo |
| 2014/0340550 A1 | 11/2014 | Kaizu et al. |
| 2014/0368697 A1 | 12/2014 | Jo et al. |
| 2015/0312463 A1 | 10/2015 | Gupta et al. |
| 2015/0341576 A1 | 11/2015 | Gu et al. |
| 2016/0248956 A1 | 8/2016 | Mitsunaga |
| 2017/0034412 A1 | 2/2017 | Jo et al. |

OTHER PUBLICATIONS

Aggarwal, M. and Ahuja, N., "Split Aperture Imaging for High Dynamic Range", In Proceedings of the 8th IEEE International Conference on Computer Vision (ICCV '01), Vancouver, BC, CA, Jul. 10-14, 2001, pp. 10-17.

Barakat, N., et al., "Minimal-Bracketing Sets for High-Dynamic Range Image Capture", In IEEE Transactions on Image Processing, vol. 17, No. 10, Oct. 2008, pp. 1864-1875.

Chen, T. and Gamal, A.E., "Optimal Scheduling of Capture Times in a Multiple Capture Imaging System", In Proceedings of Sensors and Camera Systems for Scientific, Industrial, and Digital Photography Applications III (SPIE 4669), San Jose, CA, US, Jan. 19, 2002, pp. 288-296.

Debevec, P. and Malik, J., "Recovering High Dynamic Range Radiance Maps from Photographs", In Proceedings of ACM SIGGRAPH, Los Angeles, CA, US, Aug. 5-7, 1997, pp. 369-378.

Durand, F. and Dorsey, J., "Fast Bilateral Filtering for the Display of High-Dynamic-Range Images", In the Proceedings of the 29th Annual Conference on Computer Graphics and Interactive Techniques (SIGGRAPH |02), San Antonio, TX, US, Jul. 21-26, 2002, pp. 257-266.

Gallo, O., et al., "Artifact-Free High Dynamic Range Imaging", In Proceedings of the 2009 IEEE International Conference on Computational Photography (ICCP '09), San Francisco, CA, US, Apr. 16-17, 2009, pp. 1-7.

Gallo, O., et al., "Metering for Exposure Stacks", In Computer Graphics Forum, May 2012, vol. 31, No. 2, pp. 479-488.

Granados, M., et al., "Optimal HDR Reconstruction with Linear Digital Cameras", In Proceedings of the 2010 IEEE Conference on Computer Vision and Pattern Recognition (CVPR '10), San Francisco, CA, US, Jun. 13-18, 2010, pp. 215-222.

Grossberg, M. et al., "What is the Space of Camera Response Functions?" In Proceedings of the 2003 IEEE Computer Society Conference on Computer Vision and Pattern Recogniton (CVPR 03), Madison, WI, US, Jun. 18-20, 2003, pp. 602-609.

Hasinoff, S.W. and Kutulakos, K.N., "A Layer-Based Restoration Framework for Variable-Aperture Photography", In Proceedings of the IEEE 11th International Conference Computer Vision (IGCV '07), Rio de Janeiro, BE, Oct. 14-21, 2007, pp. 1-8.

Hasinoff, S.W., et at., "Noise Optimal Capture for High Dynamic Range Photography", In Proceedings of the 2010 IEEE Conference on Computer Vision and Pattern Recognition (CVPR '10), San Francisco, CA, US, Jun. 13-18, 2010, pp. 553-560.

Hirakawa, K. and Simon, P.M., "Single-Shol High Dynamic Range Imaging with Conventional Camera Hardware", In Proceedings of the 2011 IEEE International Conference on Computer Vision (ICCV '11), Barcelona, ES, Nov. 6-13, 2011, pp. 1339-1346.

Hirakawa, K. and Wolfe, P.J., "Optimal Exposure Control for High Dynamic Range Imaging", In Proceedings of the 2010 17th IEEE International Conference on Image Processing (ICIP '10), Hong Kong, CN, Sep. 26-29, 2010, pp. 3137-3140.

Hu, J., et al., "Exposure Stacks of Live Scenes with Hand-Held Cameras", In Proceedings of the 12th European Conference on Computer Vision (ECCV '12), Florence, IT, Oct. 7-13, 2012, pp. 499-512.

International Preliminary Report on Patentability dated Jul. 2, 2015 in International Patent Application No. PCT/US2013/072385.

International Search Report and the Written Opinion of the International Searching Authority dated Dec. 5, 2014 in International Patent Application No. PCT/US2013/072385.

Jacobs, K., et al., "Automatic High Dynamic Range Image Generation for Dynamic Scenes", In IEEE Computer Graphics and Applications, vol. 28, No. 2, Mar.-Apr. 2008, pp. 84-93.

Jinno, T. and Okuda, M., "Multiple Exposure Fusion for High Dynamic Range Image Acquisition", In Journal of Latex Class Files, vol. 6, No. 1, Jan. 2007, pp. 1-9.

Kang, S.B., et al., "High Dynamic Range Video", In Journal of ACM Transactions on Graphics, vol. 22, No. 3., Jul. 2003, pp. 319-325.

Khan, E.A., et al., "Ghost Removal in High Dynamic Range Images", In Proceedings of the 2006 IEEE International Conference on Image Processing (ICIP '06), Atlanta, GA, US, Oct. 8-11, 2006, pp. 2005-2008.

Liu, X. and Gamal, A.E., "Synthesis of High Dynamic Range Motion Blue Free Image From Multiple Captures", In IEEE Transactions on Circuits and Systems I: Fundamental Theory and Applications, vol. 50, No. 4, Apr. 2003, pp. 530-539.

(56) References Cited

OTHER PUBLICATIONS

Mann, S. and Picard, R.W., "On Being 'Undigital' with Digital Cameras: Extending Dynamic Range by Combining Differently Exposed Pictures", In Proceedings of Society for Imaging Science and Technology's 48th Annual Conference (IS&T '95), Washington DC, US, May 1995, pp. 442-448.

Mertens, T., et al., "Exposure Fusion", In Proceedings of the 15th Pacific Conference on Computer Graphics and Applications (PG '07), Maui, HI, US, Oct. 29-Nov. 2, 2007, pp. 382-390.

Nayar, S.K., and Branzoi, V., "Adaptive Dynamic Range Imaging: Optical Control of Pixel Exposures Over Space and Time", In Proceedings of the 9th IEEE International Conference on Computer Vision (CVPR '03), Nice, FR, Oct. 13-16, 2003, pp. 1168-1175.

Nayar, S.K., and Mitsunaga, T., "High Dynamic Range Imaging: Spatially Varying Pixel Exposures", In Proceedings of IEEE Conference on Computer Vision and Pattern Recognition (CVPR), Hilton Head Island, SC, US, Jun. 15, 2000, pp. 472-479.

Olson, T., "High Dynamic Range Astronomical Imaging", In the 15lh Color and Imaging Conference Final Program and Proceedings, Society for Imaging Science and Technology, Jan. 2007, pp. 304-312.

Reinhard, E., et al., "Photographic Tone Reproduction for Digital Images", In Proceedings of the 29th Annual Conference on Computer Graphics and Interactive Techniques (SIGGRAPH '02), San Antonio, TX, US, Jul. 21-26, 2002, pp. 267-276.

Rouf, M., et al., "Glare Encoding of High Dynamic Range Images", In Proceedings of the 2011 IEEE Conference on Computer Vision and Pattern Recognition (CVPR '11), Colorado Springs, CO, US, Jun. 20-25, 2011, pp. 289-296.

Schleicher, D. and Zagar, B.G., "High Dynamic Range Imaging by Varying Exposure Time, Gain, and Aperture of a Video Camera", In Proceedings of the 2010 IEEE Instrumentation and Measurement Technology (I2MTC), Austin, TX, US, May 3-6, 2010, pp. 486-491.

Sellent, A., et al., "Motion Field Estimation from Alternate Exposure Images", In IEEE Transactions on Pattern Analysis and Machine Intelligence, vol. 33, No. 8, Aug. 2011, pp. 1577-1589.

Sun, D., et al, "Secrets of Optical Flow Estimation and their Principles", In Proceedings of the 2010 IEEE Conference on Computer Vision and Patttern Recognition (CVPR '10), San Francisco, CA, US, Jun. 13-18, 2010, pp. 2432-2439.

Telleen, J., et al., "Synthetic Shutter Speed Imaging," In Eurographics 2007, vol. 26, No. 3, Oct. 2007, pp. 591-598.

Tallon, M.D., et al., "Space-Variant Blur Deconvolusion and Denoising in the Dual Exposure Problem", In Journal on Information Fusion, vol. 14, No. 4, Oct. 2013, pp. 396-409.

Tocci, M.D., et al., "A Versatile HDR Video Production System", In Journal of ACM Transactions on Graphics, vol. 30, No. 4, Jul. 2011, article 41, pp. 1-9.

Ward, G., "Fast, Robust Image Registration for Compositing High Dynamic Range Photographs from Handheld Exposures", In Journal of Graphics Tools, vol. 8, No. 2, (month unknown) 2003, pp. 17-30.

Wikipedia, "Generalizations of Fibonacci Numbers", Wikipedia.org, last modified Apr. 16, 2015, pp. 1-9, available at: http://en.wikipedia.org/wiki/generalizations_of_fibonacci_numbers.

Yuan, L., et al., "Blurred/Non-Blurred Image Alignment Using Sparseness Prior", In Proceedings of the IEEE 11th International Conference on Computer Vision (ICCV '07), Rio de Janeiro, BR, Oct. 14-21, 2007, pp. 1-8.

Zhang, L., et al., "Denoising Versus Deblurring: HDR Techniques Using Moving Cameras", In Proceedings of the 2010 IEEE Conference on Computer Vision and Pattern Recognition (CVPR '10), San Francisco, CA, US, Jun. 13-18, 2010, pp. 522-529.

Zimmer, H., et al., "Freehand HDR Imaging of Moving Scenes with Simultaneous Resolution Enhancement", In Proceedings of the Computer Graphics Forum, vol. 30, No. 2, Apr. 2011, pp. 405-414.

U.S. Appl. No. 13/399,222, filed Feb. 17, 2012, Kaizu et al.
U.S. Appl. No. 13/452,977, filed Apr. 23, 2012, Jo et al.
U.S. Appl. No. 13/457,774, filed Apr. 27, 2012, Kaizu et al.
U.S. Appl. No. 13/487,682, filed Jun. 4, 2012, Kaizu et al.
U.S. Appl. No. 13/504,905, filed Dec. 7, 2012, Gu et al.
U.S. Appl. No. 13/559,720, filed Jul. 27, 2012, Kaizu et al.
U.S. Appl. No. 13/565,202, filed Aug. 2, 2012, Takeuchi.
U.S. Appl. No. 13/983,672, filed Aug. 5, 2013, Mitsunaga
U.S. Appl. No. 14/000,647, filed Aug. 21, 2013, Kaizu et al.
U.S. Appl. No. 14/001,139, filed Mar. 24, 2014, Hitomi et al.
U.S. Appl. No. 14/131,221, filed Mar. 21, 2014, Kasai et al.
U.S. Appl. No. 14/238,216, filed Feb. 11, 2014, Mitsunaga
U.S. Appl. No. 14/319,212, filed Jun. 30, 2014, Kaizu et al.
U.S. Appl. No. 14/326,963, filed Jul. 9, 2014, Kaizu et al.
U.S. Appl. No. 14/472,153, filed Aug. 28, 2014, Jo et al.
U.S. Appl. No. 14/652,397, filed Jun. 15, 2015, Gupta et al.
U.S. Appl. No. 14/816,976, filed Aug. 3, 2015, Gu et al.
U.S. Appl. No. 15/143,336, filed Apr. 29, 2016, Mitsunaga
U.S. Appl. No. 15/302,670, filed Oct. 7, 2016, Jo et al.
U.S. Appl. No. 15/405,962, filed Jan. 13, 2017, Hitomi et al.

* cited by examiner

FIG. 4A
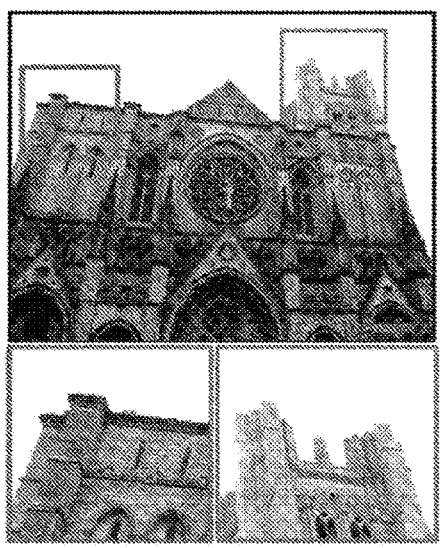
LDR Image
FIG. 4B
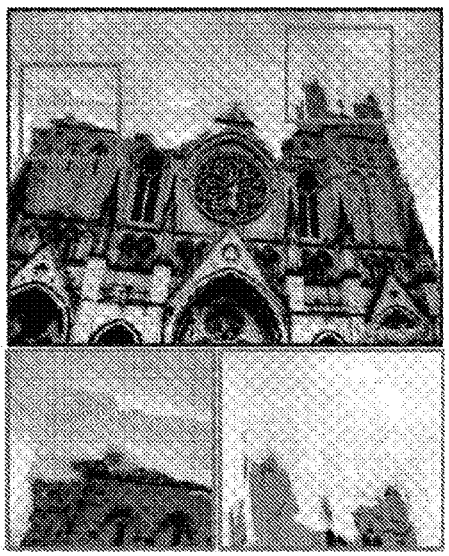
HDR Image
(Alternating Exposures)
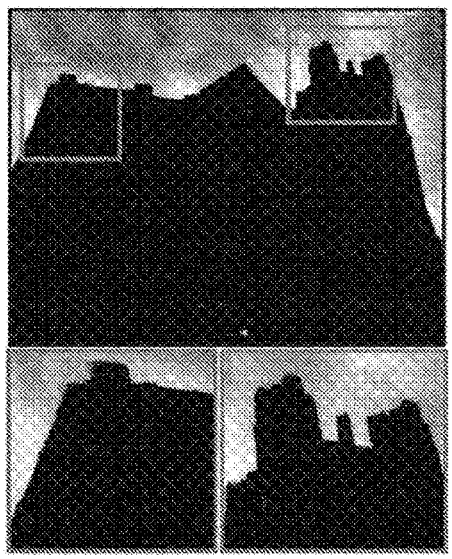
HDR Image
(Burst of Short Exposures)
FIG. 4C
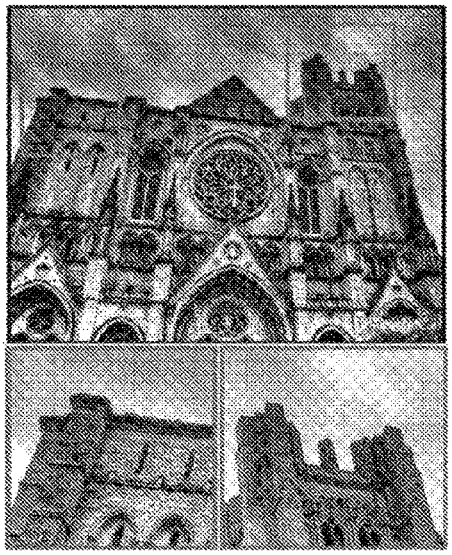
HDR Image
(Fibonacci Bracketing and
Generalized Registration)
FIG. 4D

METHODS, SYSTEMS, AND MEDIA FOR HIGH DYNAMIC RANGE IMAGING

CROSS REFERENCE TO RELATED APPLICATIONS

This application is a continuation of and claims the benefit under 35 U.S.C. § 120 of U.S. patent application Ser. No. 14/652,397, filed on Jun. 15, 2015, which is a U.S. National Stage Application under 35 U.S.C. § 371 of International Application No. PCT/US2013/072385, filed on Nov. 27, 2013, which claims the benefit of U.S. Provisional Application No. 61/738,193, filed on Dec. 17, 2012. The entire contents of these applications are hereby incorporated by reference in their entireties.

TECHNICAL FIELD

The disclosed subject matter relates to methods, systems, and media for high dynamic range imaging.

BACKGROUND

Users of digital imaging devices often wish to capture an image of scene having a high dynamic range, such as a scene having a large difference in brightness between the darkest portion of the scene and the lightest portion of the scene. Due to motion in the scene and/or motion of the camera during image capture, existing high dynamic range imaging techniques typically include undesirable artifacts due to registration errors (e.g., due to motion), or generate an image that does not have a significantly higher dynamic range than if a single low dynamic range image were captured.

Therefore, there is a need for new mechanisms for high dynamic range imaging.

SUMMARY

In accordance with various embodiments of the disclosed subject matter, methods, systems, and media for high dynamic range imaging are provided.

In accordance with some embodiments of the disclosed subject matter, a system for high dynamic range imaging is provided, the system comprising: an image sensor; and a hardware processor configured to: cause the image sensor to capture first image data having a first exposure time, second image data having a second exposure time, and third image data having a third exposure time that is substantially equal to the sum of the first exposure time and the second exposure time; generate combined image data using the first image data and the second image data; determine first estimated motion data representative of motion between the combined image data and the third image data; determine second estimated motion data representative of motion between the second image data and the third image data based on the first estimated motion data; and generate a high dynamic range image using at least the first image data, the second image data, the third image data, and the second estimated motion data.

In accordance with some embodiments of the disclosed subject matter, a method for high dynamic range imaging is provided, the method comprising: causing an image sensor to capture first image data having a first exposure time, second image data having a second exposure time, and third image data having a third exposure time that is substantially equal to the sum of the first exposure time and the second exposure time; generating combined image data using the first image data and the second image data; determining first estimated motion data representative of motion between the combined image data and the third image data; determining second estimated motion data representative of motion between the second image data and the third image data based on the first estimated motion data; and generating a high dynamic range image using at least the first image data, the second image data, the third image data, and the second estimated motion data.

In accordance with some embodiments of the disclosed subject matter, a non-transitory computer-readable medium containing computer executable instructions that, when executed by a processor, cause the processor to perform a method for high dynamic range imaging is provided, the method comprising: causing an image sensor to capture first image data having a first exposure time, second image data having a second exposure time, and third image data having a third exposure time that is substantially equal to the sum of the first exposure time and the second exposure time; generating combined image data using the first image data and the second image data; determining first estimated motion data representative of motion between the combined image data and the third image data; determining second estimated motion data representative of motion between the second image data and the third image data based on the first estimated motion data; and generating a high dynamic range image using at least the first image data, the second image data, the third image data, and the second estimated motion data.

In accordance with some embodiments of the disclosed subject matter, a system for high dynamic range imaging is provided, the system comprising: means for causing an image sensor to capture first image data having a first exposure time, second image data having a second exposure time, and third image data having a third exposure time that is substantially equal to the sum of the first exposure time and the second exposure time; means for generating combined image data using the first image data and the second image data; means for determining first estimated motion data representative of motion between the combined image data and the third image data; means for determining second estimated motion data representative of motion between the second image data and the third image data based on the first estimated motion data; and means for generating a high dynamic range image using at least the first image data, the second image data, the third image data, and the second estimated motion data.

In some embodiments, the sum of the first exposure time and the second exposure time includes a time between capturing the first image data and capturing the second image data.

In some embodiments, the first exposure time corresponds to a minimum exposure time of the image sensor.

In some embodiments, the system further comprises: means for causing the image sensor to capture fourth image data having a fourth exposure time that is substantially equal to the sum of the second exposure time and the third exposure time; means for generating second combined image data using the second image data and the third image data; means for determining third estimated motion data representative of motion between the combined image data and the third image data; means for determining fourth estimated motion data representative of motion between the third image data and the fourth image data based on the third estimated motion data; and means for generating the high dynamic range image using the fourth image data and the fourth estimated motion data.

In some embodiments, the system further comprises: means for receiving a time budget for capturing a plurality of images including images corresponding to the first image data, the second image data and the third image data; means for determining one or more properties of the scene to be captured; means for determining at least the first exposure time and the second exposure time based at least in part on the one or more properties of the scene.

In some embodiments, the one or more properties of the scene include at least one of a dynamic range of the scene, an amount of scene motion, and an amount of camera motion.

In some embodiments, the system further comprises means for scaling the first estimated motion data based on a ratio of the sum of the second exposure time and the third exposure time to the sum of the first exposure time, the second exposure time and the third exposure time.

In some embodiments, the system further comprises: (a) means for receiving an instruction to capture video; (b) means for receiving one or more properties of the scene to be captured; (c) means for setting one or more exposure times to be used in capturing a frame of video based on the one or more properties of the scene; (d) means for causing image data to be captured by the image sensor using the first exposure time, the second exposure time, and the third exposure time in response to determining that the one or more exposure times includes the first exposure time, the second exposure time, and the third exposure time; (e) means for causing image data to be captured by the image sensor using at least a fourth exposure time in response to determining that the one or more exposure times do not include the first exposure time, the second exposure time, and the third exposure time; (f) means for determining a value of at least one of the one or more properties based on the image data captured at either (d) or (e); (g) means for repeating (b)-(f) until an instruction is received to stop capturing video; (h) means for generating the high dynamic range image using at least a portion of the image data captured at (d); and (i) means for storing the high dynamic range image as a frame of the video.

In accordance with some embodiments, a system for high dynamic range imaging is provided, the system comprising: an image sensor; and a hardware processor configured to: cause the image sensor to capture n frames of image data, each frame having an exposure time such that the exposure time of the nth frame is substantially equal to the sum of the exposure times of the first n−1 frames; generate combined image data using the first n−1 frames of image data; determine first estimated motion data representative of motion between the combined image data and the image data of the nth frame; determine second estimated motion data representative of motion between the image data of the n−1 st frame and the image data of the nth frame based on the first estimated motion data; and generate a high dynamic range image using at least the image data of the n frames of image data and the second estimated motion data.

In accordance with some embodiments of the disclosed subject matter, a method for high dynamic range imaging is provided, the method comprising: causing an image sensor to capture n frames of image data, each frame having an exposure time such that the exposure time of the nth frame is substantially equal to the sum of the exposure times of the first n−1 frames; generating combined image data using the first n−1 frames of image data; determining first estimated motion data representative of motion between the combined image data and the image data of the nth frame; determining second estimated motion data representative of motion between the image data of the n−1 st frame and the image data of the nth frame based on the first estimated motion data; and generating a high dynamic range image using at least the image data of the n frames of image data and the second estimated motion data.

In accordance with some embodiments, a system for high dynamic range imaging is provided, the system comprising: means for causing an image s to capture n frames of image data, each frame having an exposure time such that the exposure time of the nth frame is substantially equal to the sum of the exposure times of the first n−1 frames; means for generating combined image data using the first n−1 frames of image data; means for determining first estimated motion data representative of motion between the combined image data and the image data of the nth frame; determining second estimated motion data representative of motion between the image data of the n−1 st frame and the image data of the nth frame based on the first estimated motion data; and means for generating a high dynamic range image using at least the image data of the n frames of image data and the second estimated motion data.

In some embodiments, n is greater than two.

In some embodiments, the system further comprises: means for receiving a time budget for capturing a plurality of images including images corresponding to the n frames of image data; means for determining one or more properties of the scene to be captured; and means for determining at least the exposure time of the first n−1 frames of image data based at least in part on the one or more properties of the scene.

In some embodiments, wherein determining the second estimated motion data comprises scaling the first estimated motion data based on a ratio of the sum of the exposure time of the n−1 st frame and the exposure time of the nth frame to the sum of the exposure times for the n frames.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 4A-4D show examples of images of a scene capture using various different techniques under similar conditions (e.g., similar lighting, similar scene and/or camera motion, etc.) in accordance with some embodiments of the disclosed subject matter.

DETAILED DESCRIPTION

In accordance with various embodiments, mechanisms for high dynamic range imaging are provided. In accordance with some embodiments, the mechanisms described herein can cause a series of frames of image data to be captured with different exposure times according to an exposure bracketing scheme. The exposure bracketing scheme can be, for example, a Fibonacci exposure bracketing scheme. In a Fibonacci exposure bracketing scheme, the exposure time of the third frame of image data can be substantially equal to the combined exposure times of the first frame and the second frame of image data, the exposure time of the fourth frame of image data can be substantially equal to the combined exposure times of the second frame and the third frame of image data, and so on. For example, the mechanisms described herein can cause ten frames of image data with exposure times that increase according to a Fibonacci sequence to be captured of a scene that includes an object (such as a person) that is backlit by a bright source of light (such as the sun).

In some embodiments, the mechanisms described herein can estimate motion between image data having equal exposure times. For example, in the case of the Fibonacci exposure bracketing scheme, the mechanisms described herein can estimate motion between combined image data of the first frame and second frame to image data of the third frame. After estimating the motion between substantially equal exposure times, the mechanisms described herein can estimate motion between consecutive frames of image data. For example, the estimated motion from the combined image data of the first frame and second frame to the image data of the third frame can be used to estimate motion between the second frame and third frame (e.g., based on the exposure times).

In some embodiments, the mechanisms described herein can use the image data and the motion estimation to generate a high dynamic range image of the scene. As described in more detail below, the mechanisms described herein can use the estimated motion to, for example, align the image data corresponding to objects that move between frames in order to eliminate effects due to camera and/or scene motion. Returning to the above example of the scene of a backlit object, the ten frames of image data can be combined to form a high dynamic range image. The mechanisms can use the estimated motion, for example, to match image data that corresponds to the backlit object between frames which can eliminate artifacts such as ghost images of the backlit object that may result from misalignment between frames.

Figure 1:
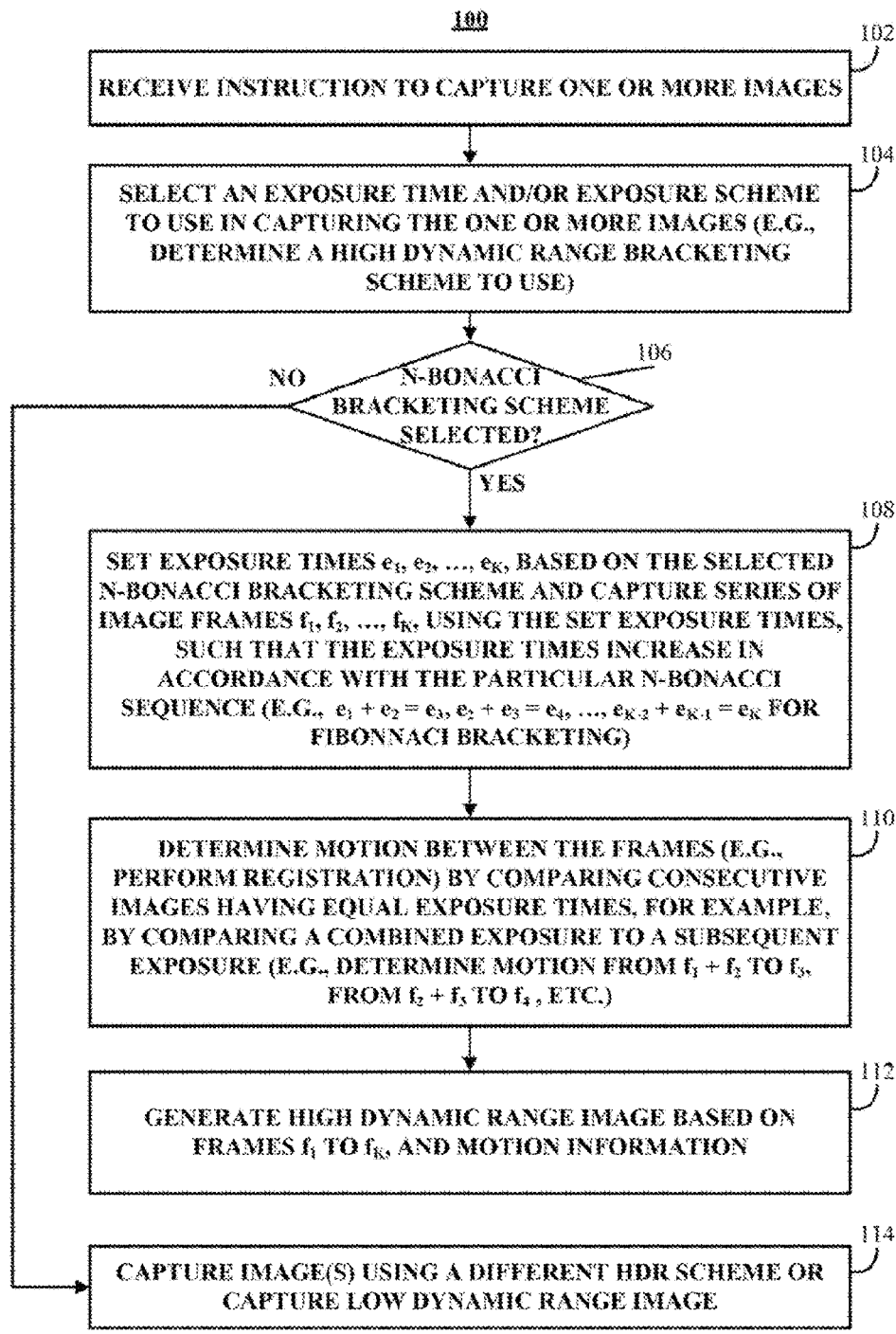
FIG. 1 shows an example of a process for capturing high dynamic range images in accordance with some embodiments of the disclosed subject matter.

Turning to FIG. 1, an example 100 of a process for high dynamic range imaging is shown in accordance with some embodiments of the disclosed subject matter. In some embodiments, process 100 can begin by receiving an instruction to capture one or more images using an imaging device at 102.

In some embodiments, any suitable imaging device can be used to capture images in accordance with process 100. For example, any suitable digital camera can be used to capture images such as a digital single-lens reflex (SLR) camera, a digital point-and-shoot camera, a machine vision camera, a digital camera of a mobile device (e.g., a smartphone, a tablet computer, a wearable computer, or any other suitable mobile device), a digital machine vision camera, a high definition digital camcorder, and/or any other suitable digital imaging device. The digital camera can include any suitable image sensor, such as a charge-coupled device (CCD) based image sensor, a complementary metal-oxide-semiconductor (CMOS) based image sensor, or any other suitable image sensor.

In some embodiments, the instruction received at 102 can be an instruction to capture any suitable number and/or type of images. For example, the instruction received at 102 can include an instruction to capture a single low dynamic range image (e.g., a single image captured from an exposure of the image sensor). In some embodiments, a low dynamic range (LDR) image can be an image that is captured by an image sensor (e.g., a CCD image sensor, a CMOS image sensor) using a single exposure time for each pixel of the image sensor.

As another example, the instruction received at 102 can include an instruction to capture multiple low dynamic range images (e.g., multiple images captured from multiple different exposures of the image sensor) such as would be captured, for example, in a burst mode of some digital cameras. As yet another example, the instruction received at 102 can include an instruction to capture a low dynamic range video.

As still another example, the instruction received at 102 can include an instruction to capture a high dynamic range (HDR) image (e.g., a single image generated from multiple exposures and/or multiple exposure times of the image sensor). In some embodiments, a high dynamic range image can be a single image that is captured by an image sensor (e.g., a CCD image sensor, a CMOS image sensor) using different exposure times for different pixels of the image sensor. Alternatively, a high dynamic range image can be a single image that is generated by combining two or more images captured at different times by the same image sensor at different points in time (e.g., captured by an image sensor during consecutive exposures) and having either substantially the same exposure times (e.g., each image has the same exposure time) or having at least two different exposure times. In some embodiments, a high dynamic range image can be an image that is generated by combining two or more images captured using two or more image sensors that capture an image of substantially the same scene (e.g., by sharing at least part of an optical path of a camera that includes the image sensors) having either substantially the same exposure times (e.g., each image has the same exposure time) or having at least two different exposure times. As a further example, the instruction received at 102 can include an instruction to capture high dynamic range video.

As a further example, the instruction received at 102 can include an instruction to capture an image using settings automatically determined by a computing device associated with a camera that received the instruction at 102. In a more particular example, the instruction received at 102 can be an instruction received when the camera is in an automatic mode in which one or more properties of the scene are analyzed and used in determining an exposure and/or other settings to be used in capturing an image. As yet another further example, the instruction received at 102 can include an instruction to capture an image using settings that are automatically determined by a computing device associated with a camera that received the instruction at 102. Any suitable technique or techniques can be used to automatically determine settings that are to be used in capturing an image.

In some embodiments, a camera that is executing process 100 can capture an image based on one or more camera settings that determine how an image or images are to be captured and/or processed by the camera. One or more of these camera settings can be adjusted to change how an image is captured and/or processed. For example, the settings can include whether to capture a low dynamic range image or a high dynamic range image. As another example, the settings can include an exposure time to be used in capturing an image. As yet another example, the settings can include a focal length of an optical system of the camera to be used in capturing an image. Additionally or alternatively, a camera executing process 100 can include any other suitable settings that determine how an image or images are to be captured and/or processed by the camera.

In some embodiments, one or more of the camera settings can be adjusted by a user (e.g., using a hardware-based interface of the camera and/or a software-based interface of the camera, such as a graphical user interface). Additionally or alternatively, adjustment of one or more camera settings can be performed automatically by the camera executing process 100 based on any suitable factors. For example, the camera can use one or more sensors (which can include the image sensor) to determine lighting conditions and/or an amount of motion in a scene and can adjust the exposure time or other appropriate settings based on the lighting conditions and/or amount of motion. As another example, a user can select a particular type of image to be captured and/or can select a particular type of scene to be captured (e.g., an action scene, a backlit scene, a nighttime scene, a landscape scene, and/or any other suitable scene). As still another example, a user can select particular settings to be used in capturing an image such as a particular ISO level to be used, a particular focal distance to be used, and/or any other particular settings.

Although the mechanisms described herein are generally discussed with reference to exposure times, other properties of a camera can be varied to adjust an exposure in addition to or instead of varying the exposure time. For example, a gain associated with each pixel of an image sensor can be varied (either individually or in groups of two or more) to vary the exposure of the pixels. As another example, a sensitivity of each pixel of an image sensor can be varied (either individually or in groups of two or more) to vary the exposure of the pixels. As yet another example, an amount of light allowed to impinge the image sensor can be varied to control the exposure (e.g., using a physical shutter, using a diaphragm, using a liquid crystal shutter, or using any other suitable technique).

At 104, process 100 can select an exposure time and/or an exposure scheme to be used in capturing the one or more images. In some embodiments, process 100 can determine whether a high dynamic range image is to be captured and/or can determine a particular high dynamic range scheme which is to be used in capturing the high dynamic range image. Any suitable information can be used in determining whether a high dynamic range image is to be captured and/or a particular high dynamic range bracketing scheme to use in capturing a high dynamic range image. For example, as described above in connection with 102, an instruction to capture an image can be an instruction to capture a high dynamic range image. In a more particular example, a camera executing process 100 can be set by a user to capture a high dynamic range image. As another example, a camera executing process 100 can determine lighting conditions (or properties) of a scene, and can automatically determine whether a high dynamic range image is to be captured based on the lighting conditions. In a more particular example, the camera executing process 100 can estimate a dynamic range of a scene (e.g., a difference between a brightest area of the scene and a darkest area of the scene). In this example, process 100 can determine that a high dynamic range image is to be captured if the estimated dynamic range of the scene is greater than a threshold dynamic range.

Additionally or alternatively, in some embodiments, a camera executing process 100 can be configured such that multiple different high dynamic range exposure bracketing schemes can be implemented by the camera. These multiple different high dynamic range image capturing schemes can, for example, be suitable for capturing scenes with different properties. For example, a first high dynamic range exposure bracketing scheme may be suitable for capturing a scene with a very high dynamic range, but may not be suitable for capturing scenes with more than a small amount of scene and/or camera motion. As another example, a second high dynamic range exposure bracketing scheme may be suitable for capturing scenes with a relatively large amount of scene and/or camera motion, but may not be suitable for capturing scenes with a relatively large dynamic range. In some embodiments, the camera executing process 100 can be capable of using any suitable number of high dynamic range exposure bracketing schemes for capturing a high dynamic range image.

In some embodiments, a dynamic range that can be achieved by a particular exposure bracketing scheme can be expressed by the following:

$$DR = \log\left(\left(\frac{I_{max}}{I_{min}}\right)\left(\frac{e_{max}}{e_{min}}\right)\right), \quad (1)$$

where $e_{max}$ and $e_{min}$ can correspond to the maximum exposure time and the minimum exposure time in the bracketing scheme, respectively. Similarly, $I_{max}$ can correspond to the maximum signal that can be output by the sensor (e.g., a full well capacity of the sensor) being used to capture the images, and $I_{min}$ can correspond to the minimum signal that can be output by the sensor (e.g., based on a dark current, read noise, etc., of the sensor). In some embodiments, process 100 can select an exposure bracketing scheme at 104 based at least in part on a ratio of maximum exposure time to minimum exposure time (i.e., $e_{max}/e_{min}$) achieved by the scheme. For example, for a scene with lower dynamic range, process 100 can select an exposure bracketing scheme with a relatively low ratio of maximum exposure time to minimum exposure time. In a more particular example, process 100 can select a single exposure (e.g., where $e_{max}/e_{min}=1$) in cases where the dynamic range of the scene to be captured corresponds to the dynamic range of the image sensor (i.e., $I_{max}/I_{min}$). In another example, for a scene with a dynamic range that is greater than the dynamic range of the image sensor, process 100 can select an exposure bracketing scheme with a higher ratio of maximum exposure time to minimum exposure time. In another more particular example, process 100 can select an exposure bracketing scheme in which the maximum exposure time is one or more orders of magnitude higher than the minimum exposure time (e.g., where $e_{max}/e_{min}>10^3$).

In some embodiments, an image sensor used with the mechanisms described herein can have a particular intensity resolution. The intensity resolution of an image sensor can be the number of discrete grey levels or brightness levels that the image sensor is capable of reading out for a particular exposure. In some embodiments, an effective intensity resolution of a high dynamic range image captured using an exposure bracketing scheme (such as the exposure bracketing schemes described herein) can be represented as:

$$IR = q + \sum_{i=2}^{K} R\left((q-1) - (q-1)\left(\frac{e_i}{e_{i-1}}\right)\right), \quad (2)$$

where q is the number of quantization levels of the sensor (i.e., the number of grey levels) for a single image (i.e., $2^b$ for a b-bit sensor), R(x) is the round-to-nearest-integer function and, as described below, $e_i$ is the exposure time of frame i of the K exposures captured in accordance with the exposure bracketing scheme.

In some embodiments, process 100 can select an N-bonacci exposure bracketing scheme (described in more detail below in connection with 108) as an exposure bracketing scheme to be used in capturing a high dynamic range image, at 104. Additionally or alternatively, process 100 can select a particular order of the N-bonacci scheme (i.e., a value of N) at 104, and/or can select an order of an iso-exposure property (described in more detail below in connection with 108) of an exposure bracketing scheme to be used in capturing the high dynamic range image. In some embodiments, as described above, process 100 can select the N-bonacci scheme and/or the order of the N-bonacci scheme as an exposure bracketing scheme to be used based on one or more settings of a camera executing process 100 and/or one or more properties of the scene.

At 106, process 100 can determine whether an N-bonacci exposure bracketing scheme is selected for capturing a high dynamic range image (described in more detail below in connection with 108). If an N-bonacci bracketing scheme is not selected ("NO" at 106), process 100 can proceed to 114, where an image or images can be captured using a different high dynamic range exposure bracketing scheme, using a low dynamic range exposure scheme, and/or using any other suitable exposure scheme.

Otherwise, if an N-bonacci bracketing scheme is selected ("YES" at 106), process 100 can proceed to 108. At 108, process 100 can capture a series of images according to an N-bonacci sequence.

In some embodiments, process 100 can cause a series of frames $f_1, f_2, \ldots, f_K$ having exposure times of $e_1, e_2, \ldots, e_K$, respectively, to be captured at 108. These exposures times can be set according to a particular N-bonacci sequence. For example, exposure times for exposures captured according to a Fibonacci (2-bonacci) sequence can be equal to the sum of the previous two exposure times. As another example, exposure times for exposures captured according to a tri-bonacci (i.e., 3-bonacci) sequence can be equal to the sum of the previous three exposure times.

In some embodiments, any suitable technique or techniques can be used in determining exposure times for exposures in the first N exposures of an N-bonacci bracketing scheme. For example, for a Fibonacci (2-bonacci) bracketing scheme, the first two exposure times can be set according to one or more suitable criteria. In a more particular example, an exposure time of a first frame captured according to a Fibonacci bracketing scheme (on any other suitable bracketing scheme in accordance with the mechanisms described herein) can be set based on a minimum exposure time of an image sensor. The minimum exposure time can be determined based on any suitable factors, such as a clock speed for controlling exposure, an amount of noise created by the image sensor for a given period of time, an amount of light in a scene, and/or any other suitable factors. In another more particular example, an exposure time of a second frame captured according to a Fibonacci bracketing scheme can be set based on a growth rate of the exposure times under the Fibonacci bracketing scheme. In yet another more particular example, the first exposure time can be set to any suitable value according and need not be set to the minimum exposure time. In still another more particular example, an exposure time of a second frame captured according to a Fibonacci bracketing scheme can be set to twice the exposure time of the exposure time of the first image.

As described below, a growth rate of the exposure times of an N-bonacci sequence can converge to a particular number, and this number can be used to set an exposure time of the second (or third, fourth, etc., according to N) frame captured according to the bracketing scheme. As another example, a target growth rate for the exposure times in the N-bonacci sequence can be determined (e.g., based on a dynamic range of the scene, where a larger dynamic range can indicate that a larger growth rate is desirable), and the first N exposure times can be determined based on the desired growth rate. As yet another example, the first N exposure times can be set such that, given a time budget T and an inter-frame gap δ, a maximum number of exposures can be captured in accordance with the N-bonacci bracketing scheme. As still another example, the first N exposure times can be set such that, given a time budget T and inter-frame gap δ, a maximum proportion of the time budget can be used for exposing images in accordance with the N-bonacci bracketing scheme.

In some embodiments, process 100 can set exposure times of frames captured according to an N-bonacci sequence such that the exposure time of a frame is equal to the exposure time of the previous N frames and a sum of any inter-frame time gap δ or gaps between the N frames. For example, for a Fibonacci bracketing scheme, process 100 can set an exposure time $e_3$ for the third frame $f_3$ as the sum of the previous two exposure times (e.g., $e_1$ and $e_2$) plus the inter-frame gap δ between frame $f_1$ and frame $f_2$, process 100 can set an exposure time $e_4$ for the fourth frame $f_4$ as the sum of the previous two exposure times (e.g., $e_2$ and $e_3$) plus the inter-frame gap δ between frame $f_2$ and frame $f_3$, and so on. As another example, for a tri-bonacci (i.e., 3-bonacci) bracketing scheme, process 100 can set an exposure time $e_4$ for the fourth frame $f_4$ as the sum of the previous three exposure times (e.g., $e_1$, $e_2$ and $e_3$) plus the inter-frame gaps δ between frame $f_1$ and frame $f_2$ and between frame $f_2$ and frame $f_3$, process 100 can set an exposure time $e_5$ for the fifth frame $f_5$ as the sum of the previous three exposure times (e.g., $e_2$, $e_3$ and $e_4$) plus the inter-frame gap δ between frame $f_2$ and frame $f_3$ and between frame $f_3$ and frame $f_4$, and so on.

In some embodiments, process 100 can determine a time budget to be used in capturing a high dynamic range in accordance with the mechanisms described herein. Any suitable technique or techniques can be used to determine the time budget. For example, process 100 can use an amount of scene and/or camera motion as one factor in determining a time budget. In this example, process 100 can determine that more motion indicates that a smaller time budget should be used, because a longer time budget can result in an image with more motion blur. As another example, the time budget can be determined based on a maximum frame rate of the image sensor, a time delay between frames of image data captured by the image sensor, properties of the scene, whether a single high dynamic range image is to be captured or high dynamic range video is to be captured, and/or any other suitable factors.

In some embodiments, given a time budget T for acquiring a high dynamic range image (or a frame of a high dynamic range video), image frames captured according to a particular exposure bracketing scheme (e.g., an N-bonacci exposure scheme) can be images captured with a particular set of exposures $E=[e_1, e_2, \ldots, e_K]$, such that:

$$\Sigma_{i=1}^{K} e_i = T - (K-1)\delta, \quad (3)$$

where δ is the inter-frame time gap (e.g., resulting due to sensor read-out, reset delay and/or any other factors). The maximum number of frames K can, for example, be constrained based on a maximum frame rate F (in frames-per-second (fps)) of the camera. For example, for an image sensor having a maximum frame rate of F=300 fps and a time budget of T=120 milliseconds, a maximum of K=(F*T)/1000=36 low dynamic range frames of image can be captured to be used in generating one high dynamic range image.

In some embodiments, as described herein, a series of exposures can be captured according to a particular exposure bracketing scheme having a particular iso-exposure property. The iso-exposure property of a series of images captured according to a particular exposure bracketing scheme can be indicative of a relationship between exposure times of adjacent images in the series of captured images. The iso-exposure property for the set of exposures $E=[e_1, e_2, \ldots, e_K]$ can have an order represented by two values, $n_s$ and $n_t$, such that if $\forall i \in [2 \ldots K-1]$, there exists an $n_s$ and $n_t$ that satisfy the following:

$$\sum_{j=i-n_s+1}^{i} e_j = \sum_{j=i+1}^{i+n_t} e_j. \qquad (4)$$

In some embodiments, for an exposure bracketing scheme having an order $(n_s, n_t)$ iso-exposure property, frames $F_i^s$ and $F_i^t$ can be constructed from one or more frames captured according to the exposure bracketing scheme (e.g., frames $f_1$ to $f_K$). In some embodiments, frames $F_i^s$ and $F_i^t$ can have substantially the same total exposure time, and these frames can be used in estimating motion, for example, as described below in connection with 110.

In some embodiments, process 100 can choose $n_s$ and $n_t$ based on any suitable factors. For example, process 100 can choose smaller values for $n_s$ and $n_t$, in order to minimize gaps in $F_i^s$ and $F_i^t$ where image data is not captured due to, for example, an inter-frame gap. In a more particular example, process 100 can choose $n_s$ and $n_t$ as one (e.g., order (1,1)) such that each exposure in the sequence is equal length. As another example, process 100 can choose $n_s$ and $n_t$ to provide a difference in exposure times between the exposures captured according to the exposure bracketing scheme. In another more particular example, process 100 can choose $(n_s, n_t)$ as (2, 1) such that each exposure time (after the first two exposure times) is the sum of the previous two exposures exposure times (e.g., a Fibonacci exposure bracketing scheme).

In some embodiments, process 100 can set the order of the iso-exposure property and/or the exposure times for the initial N images (e.g., using an N-bonacci bracketing scheme) such that the exposure times grow with a growth factor of $G=\phi$. In some embodiments, such as when images are captured according to a Fibonacci bracketing scheme, $\phi$ can be approximately $$\frac{1+\sqrt{5}}{2}$$

(sometimes referred to as the golden ration). As another example, for a 3-bonacci sequence $\phi$ can be approximately 1.84, for a 4-bonacci sequence $\phi$ can be 1.93, etc. In general, $\phi$ is a number between one and two for an N-bonacci sequence. Additionally or alternatively, by setting the order of the iso-exposure property and/or the exposure times for the initial N images, process 100 can set the maximum dynamic range achievable by the exposure bracketing scheme. In some embodiments, using equation (1), the dynamic range that can be achieved using Fibonacci bracketing can be expressed as:

$$DR_{fib} = \log\left(\left(\frac{I_{max}}{I_{min}}\right)\phi^{K-1}\right), \qquad (5)$$

where K is the number of frames captured in accordance with the image bracketing scheme. Similarly, the maximum dynamic range achievable by an exposure bracketing scheme can be expressed as:

$$DR_{max} = \log\left(\frac{I_{max}}{I_{min}} * \frac{T-e_{min}}{e_{min}}\right) < \log\left(\frac{I_{max}}{I_{min}} * \frac{T}{e_{min}}\right) \qquad (6)$$

where T is the time budget for capturing images and $e_{min}$ is the minimum exposure time of the image sensor. This can be the maximum dynamic range by representing the maximum difference between exposure times for a given time budget, having two exposure times of $e_{min}$ and $T-e_{min}$. Time budget T can be represented as being the sum of exposures captured by the exposure bracketing scheme, in some embodiments, as:

$$T = e_{min}\left(\frac{\phi^K - 1}{\phi - 1}\right) < e_{min}\left(\frac{\phi^K}{\phi - 1}\right). \qquad (7)$$

In some embodiments, the growth rate can be selected at 108 based on r.

In some embodiments, substituting equation (7) into equation (6), the maximum dynamic range can be expressed in terms of $\phi$ as:

$$DR_{max} < \log\left(\frac{I_{max}}{I_{min}} \frac{\phi^K}{\phi - 1}\right), \qquad (8),$$

and subtracting equation (5) from equation (8) yields the following:

$$DR_{max} - DR_{fib} < \log\left(\frac{\phi^K}{\phi - 1}\right) < 1.39. \qquad (9)$$

Accordingly, in some embodiments, process 100 can set the parameters of the Fibonacci exposure bracketing scheme (e.g., an order of the iso-exposure property, a value of the first N exposure times, etc.) such that the achievable dynamic range that can be captured is close to the maximum dynamic range.

Figure 2B:
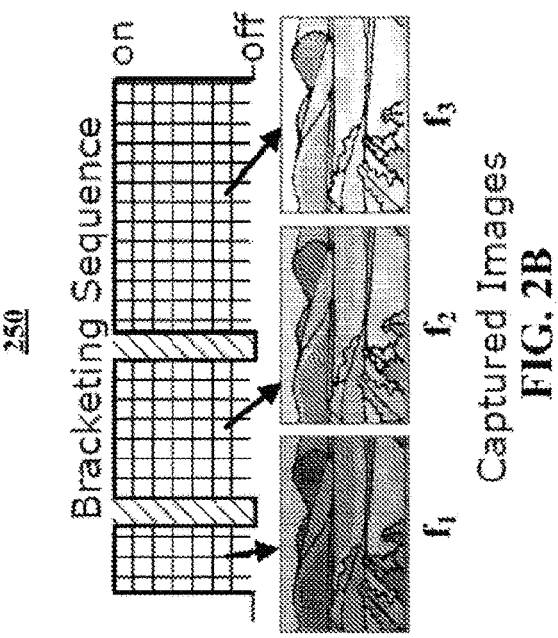
FIGS. 2A-2B show examples of exposure bracketing in accordance with some embodiments of the disclosed subject matter.
Figure 2A:
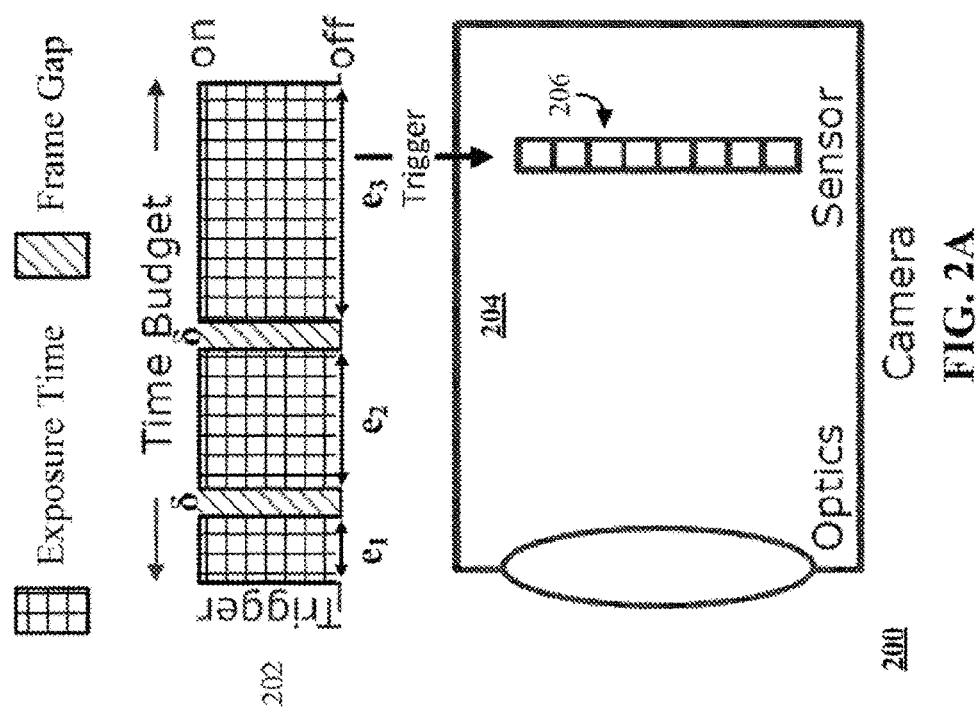

FIG. 2A shows an example 200 of exposure bracketing in accordance with some embodiments of the disclosed subject matter. As shown in FIG. 2A, a trigger signal 202 can control exposure of an image sensor 206 of camera 204. Trigger signal 202 can be generated by camera 204 (e.g., by a controller of camera 204) and/or can be received from an external source (e.g., from an external controller). As also shown in FIG. 2A, image sensor 206 can generate separate image signals during three different exposure periods $e_1$, $e_2$ and $e_3$. Additionally, in some embodiments, a time between exposures (e.g., during image readout from sensor 206, reset of sensor 206, or any other suitable operations) can result in a gap between frames which can have a time δ.

FIG. 2B shows an example 250 of illustrative frames that can be generated from exposure of image sensor 206 for the exposure times shown in FIG. 2A in accordance with some embodiments. As shown in FIG. 2B, frames $f_1$, $f_2$ and $f_3$ can be generated based on image data captured by sensor 206 during exposure times $e_1$, $e_2$ and $e_3$, respectively. Due to the different exposure times, a frame that was generated from a longer exposure time (e.g., frame $f_3$) can be generally brighter than a frame that was generated from a shorter exposure time (e.g., frame $f_1$).

Returning to FIG. 1, at 110, process 100 can determine motion between frames that are to be used to generate a high dynamic range image. In some embodiments, process 100 can determine motion between consecutive frames by first determining motion between adjacent contiguous sets of captured image data having substantially the same total exposure time. For example, if frames are captured using a Fibonacci bracketing scheme, the exposure time of the third frame is substantially equal to the combined exposure time of the first frame and second frame.

In some embodiments, differences in frames of image data captured during an exposure bracketing scheme (e.g., due to scene and/or camera motion) can lead to artifacts in the high dynamic range image. Process 100 can compare images having substantially the same exposure times when estimating motion, in some embodiments, to reduce the effects of scene and/or camera motion.

In some embodiments, process 100 can estimate the motion between two adjacent frames $f_i$ and $f_{i+1}$ by first estimating the motion between generalized frames that include at least the image data of frames $f_i$ and $f_{i+1}$. For example, in a Fibonacci exposure bracketing scheme, motion can be estimated between a combination of image data from frames $f_{i-1}$ and $f_i$, and image data from frame $f_{i+1}$. Process 100 can then use the motion estimate of the combined image data to estimate the motion between any two of the frames (e.g., $f_{i-1}$ and $f_i$), in some embodiments.

In some embodiments, process 100 can, for the set of frames captured in accordance with N-bonacci bracketing at 108 (e.g., $f_1, f_2, \ldots f_{i-1}, f_i \ldots, f_{K-1}, f_K$), generate two adjacent, contiguous sets of frames around $f_i$. These sets of image data can be represented as follows:

$$S_i^s = \{f_{i-ns+1}, f_{i-ns+2}, \ldots, f_i\}, \text{ and} \quad (10)$$

$$S_i^t = \{f_{i+1}, f_{i+2}, \ldots, f_{i+nt}\}, \quad (11)$$

where superscript s can represent the number of source frames and superscript t can represent the number of target frames to be used for motion estimation. The total number of frames in $S_i^s$ and $S_i^t$ are $n_s$ and $n_t$, respectively.

In some embodiments, the image data from the various frames in each of the sets $S_i^s$ and $S_i^t$ can be combined to form generalized frames $F_i^s$ and $F_i^t$, which can be expressed as using the following:

$$F_i^s = f_{i-n_s+1} + f_{i-n_s+2} + \cdots + f_i, \quad (12)$$

$$F_i^t = f_{i+1} + f_{i+2} + \cdots + f_{i-n_t}. \quad (13)$$

Any suitable technique or techniques can be used to combine the image data. For example, image data in a RAW format, or other unprocessed format, of the frames can be directly added. As another example, processed image data can be combined using any suitable image processing technique or techniques. In some embodiments, the combined image data can be processed such that the maximum brightness value is set to the maximum brightness value of the image sensor. For example, if two frames of image data are combined, pixels of the combined image that have a brightness value (or grey level) over the maximum brightness level (the saturation level) of the image sensor can be clipped to a saturation level of the image sensor. In a more particular example, if a particular pixel in a combined image has a brightness level of 301 and the image sensor is an 8-bit image sensor having 256 quantization levels, the brightness for the pixel in the combined image can be clipped to 256.

In some embodiments, in a situation in which the response of the image sensor used to capture frames in set $S_i^s$ has a linear response and inter-frame gap δ is negligible (e.g., in comparison to the exposure times), then $F_i^s$ would be equal to $\tilde{F}_i^s$ (that is, an image that the sensor would have captured had the sensor captured an image with an exposure time $e_i^s$ equal to $e_{i-ns+1} + e_{i-ns+2} + \ldots + e_i$). $F_i^t$ can have a similar relationship to an image $\tilde{F}_i^t$.

In some embodiments, process 100 can cause the estimated motion between $F_i^s$ and $F_i^t$ to be determined. This estimated motion can be expressed as $$\partial_{[i-n_s+1,i]}^{[i+1,i+n_t]}.$$

In some embodiments, the motion between generalized frames $F_i^s$ and $F_i^t$ can be referred to as a generalized flow between the frames. Any suitable technique or techniques can be used to estimate the generalized flow between two generalized frames. For example, an optical flow technique can be used to estimate the motion between the generalized frames. As another example, a dense optical flow technique can be used to estimate the motion between the generalized frames. As yet another example, a block matching technique can be used to estimate the motion between the generalized frames. As still another example, phase correlation and frequency domain techniques can be used to estimate the motion between the generalized frames.

In some embodiments, after determining the generalized flow $$\partial_{[i-n_s+1,i]}^{[i+1,i+n_t]},$$

process 100 can estimate the motion between any two of the frames used in calculating the generalized flow. For example, the motion between frames $f_i$ and $f_{i+1}$ can be calculated using the following relationship:

$$o_i^{i+1} = \frac{e_i + e_{i+1}}{\sum_{j=i-n_s+1}^{i+n_t} e_j} \partial_{[i-n_s+1,i]}^{[i+1,i+n_t]}, \quad (14)$$

Note that, although the exposure times are generally described herein as increasing, the longest exposure frame can be captured first, and the exposure time can decrease so that the exposure times are in accordance with an N-bonacci sequence in reverse. That is, for a Fibonacci sequence, the exposure time of the first frame is substantially equal to the exposure time of the second frame and the exposure of the third frame, exposure time of the second frame is substantially equal to the exposure time of the third frame and the exposure of the fourth frame, and so on.

Figure 3:
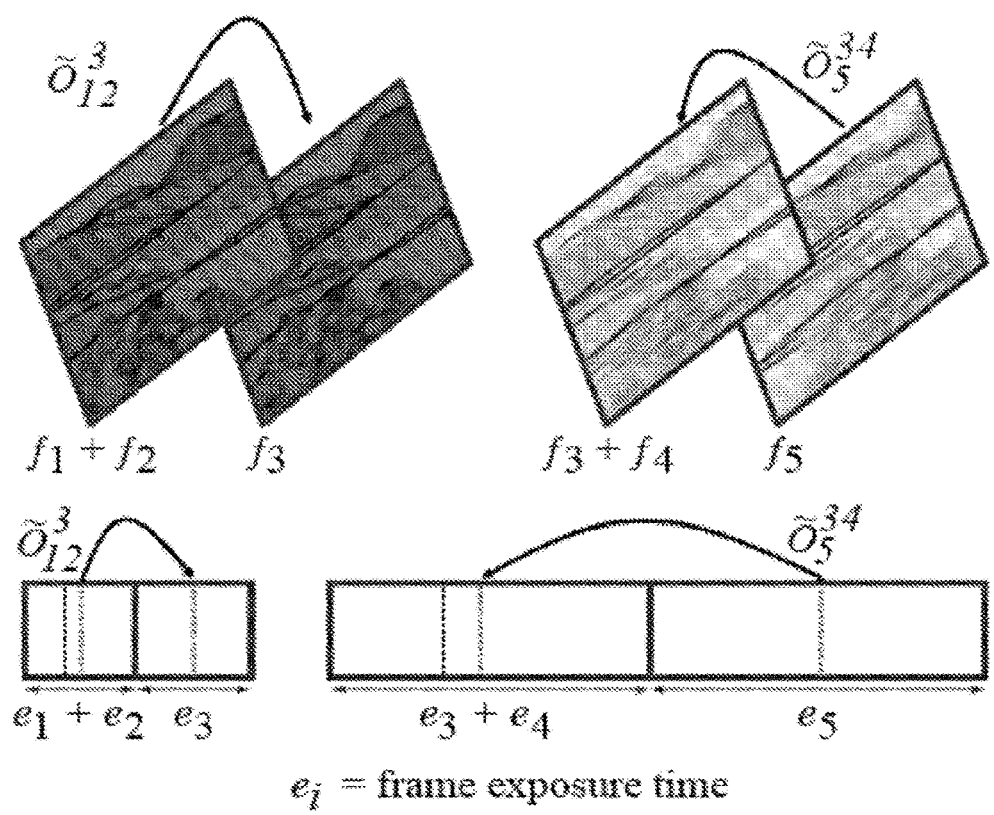
FIG. 3 shows an example of comparing contiguous sets of captured image data having substantially the same total exposure time in accordance with some embodiments of the disclosed subject matter.

FIG. 3 shows an example of comparing contiguous sets of captured image data having substantially the same total exposure time in accordance with some embodiments of the disclosed subject matter. As shown in FIG. 3, the mechanisms described herein can determine motion between a combination of image data from a first frame and a second frame (e.g., $f_1+f_2$) and image data of the third frame (e.g., $f_3$). Additionally, as shown in FIG. 3, the mechanisms described herein can determine motion between a combination of image data from a third frame and a fourth frame (e.g., $f_3+f_4$) and image data of the fifth frame (e.g., $f_5$). As shown in FIG. 3, the combination of image data from two adjacent frames (e.g., $f_1+f_2$) has a combined exposure time (e.g., $e_1+e_2$) that is substantially equal to the exposure time (e.g., $e_3$) of the third frame that is adjacent to the second frame. In the example of FIG. 3, process 100 can estimate the generalized motion $\tilde{o}_{12}^3$ between a generalized frame that corresponds to frames $f_1$ and $f_2$ (i.e., $F_1^2$) and a generalized frame that corresponds to frame $f_3$ (i.e., $F_3^3$). After determining generalized flow $\tilde{o}_{12}^3$, process 100 can then estimate the flow between frames $f_2$ and $f_3$, using equation (14), such that $$o_2^3 = \frac{e_2+e_2}{e_1+e_2+e_2}\tilde{o}_{12}^3.$$

Similarly, process 100 can estimate the generalized flow $\tilde{o}_5^{34}$ from a generalized frame that corresponds to frame $f_5$ (i.e., $F_5^5$) to a generalized frame that corresponds to frames $f_3$ and $f_4$ (i.e., $F_4^3$). After determining generalized flow $\tilde{o}_5^{34}$, process 100 can then estimate the flow from frame $f_4$ to frame $f_3$, using equation (14), such that $$o_4^3 = \frac{e_3+e_4}{e_3+e_4+e_5}\tilde{o}_5^{34}.$$

Returning to FIG. 1, at 112, process 100 can generate a high dynamic range image from the information captured in frames $f_1$ to $f_K$. Additionally, the information on motion between the frames determined at 110 can be used in generating the high dynamic range image. Any suitable technique or techniques can be used to generate the high dynamic range image from the captured image data (e.g., frames $f_1$ to $f_K$) and the motion data. For example, the frames can be merged to create a high dynamic range radiance-map using any suitable technique or techniques. The radiance map can then be used, in combination with any other suitable image processing techniques, to create an image that can be displayed to a user. As another example, the frames can be fused without creating an intermediate high dynamic range image, which can be referred to as exposure-fusion. These and/or any other suitable technique or combination of techniques can be used in generating the high dynamic range image.

FIGS. 4A-4D show examples of images of a scene captured using various different techniques under similar conditions (e.g., similar lighting, similar scene and/or camera motion, etc.) in accordance with some embodiments of the disclosed subject matter. FIG. 4A shows an image of the scene captured using a single low dynamic range exposure. As shown in FIG. 4A, the background (e.g., the sky) is significantly overexposed. FIG. 4B shows an image generated by combining images captured with different exposure times and then combining the images using known techniques (e.g., not combined in accordance with the mechanisms described herein). As shown in FIG. 4B, the combined image has more even exposure between the building and the background, but the combined image also includes artifacts due to camera motion when capturing the differently exposed images. FIG. 4C shows an image generated by combining a plurality of images captured with the same (relatively short) exposure time and then combined using known techniques (e.g., not combined in accordance with the mechanisms described herein). As shown in FIG. 4C, the foreground (e.g., the building) is significantly underexposed. FIG. 4D shows an image generated using the mechanisms described herein by combining information from images captured using a Fibonacci bracketing scheme.

In a more particular example, the dynamic range in the scenes shown in FIGS. 4A-4D, is a relatively high dynamic range on the order of $10^5$ or $10^6$, which, as described above, can represent the difference in brightness between the darkest portion of the scene and the brightest portion of the scene. The maximum time budget for capturing each of the scenes in FIG. 4A-4D was 120 milliseconds (ms). The scene captured in FIG. 4A was captured using a single low dynamic range exposure. The scene captured in FIG. 4B was captured using alternating exposure times. In particular, 22 frames of image data were captured with alternating exposures of 0.3 ms and 10 ms, for a total capture time of 113.3 ms. These 22 frames were used to generate eleven high dynamic range frames centered around each of the 10 ms frames and these eleven high dynamic range were used to generate (e.g., using motion estimation between the eleven HDR frames) a single final high dynamic range image as shown in FIG. 4B. The scene captured in FIG. 4C was captured using a burst of short exposures that were then combined. In particular, 36 frames of image data were captured with an exposure time of 0.3 ms each. These 36 frames were then combined (e.g., using motion estimation between the frames). The scene captured in FIG. 4D was captured using Fibonacci bracketing in accordance with the mechanisms described herein. In particular, 11 frames were captured having exposure times of [0.3, 0.49, 0.8, 1.3, 2.12, 3.45, 5.63, 9.17, 14.95, 24.37, 39.72] ms, respectively, which were then combined to create a single high dynamic range image using the mechanisms described herein (e.g., as described in accordance with 110 and 112 of FIG. 1).

In some embodiments, process 100 can cause the images to be captured by an image sensor with a non-linear response. For example, some cameras include an image sensor with a non-linear response, such that the sensor has an increased response to low brightness in a scene and a decreased response to high brightness in a scene. Such sensors can be used in any suitable camera, for example, in point-and-shoot cameras, mobile device cameras (e.g., cameras that are integrated in smartphones, tablets, etc.), and web-cams that are used in connection with laptop and/or desktop computers.

The relationship between the intensity of a scene point P having an irradiance I in three frames having different exposure times (e.g., exposure times $e_i$, $e_{i+1}$ and $e_{i+2}$) captured by an image sensor can be expressed as follows:

$$f_i(P)=C(I), \tag{15}$$

$$f_{i+1}(P)=C(I*R), \tag{16}$$

$$f_{i+2}(P)=C(I*R^2), \tag{17}$$

where C(x) represents the sensor's response curve, and R represents the ratio of the exposure times of the frames $$\left(\text{e.g., } \frac{e_{i+1}}{e_i}\right).$$

In some embodiments, the normalized difference in irradiance for point P over the three exposures can be expressed as follows:

$$D(C, I) = \frac{|f_i + f_{i+1} - f_{i+2}|}{f_i + f_{i+1}}. \tag{18}$$

Substituting equations (15)-(17), equation (18) can be expressed as follows:

$$D(C, I) = \frac{|C(I) + C(I*R) - C(I*R^2)|}{C(I) + C(I*R)}. \tag{19}$$

In some embodiments, the average error for a particular response function can be the integral of the difference over the range of scene irradiances I.

Figure 5:
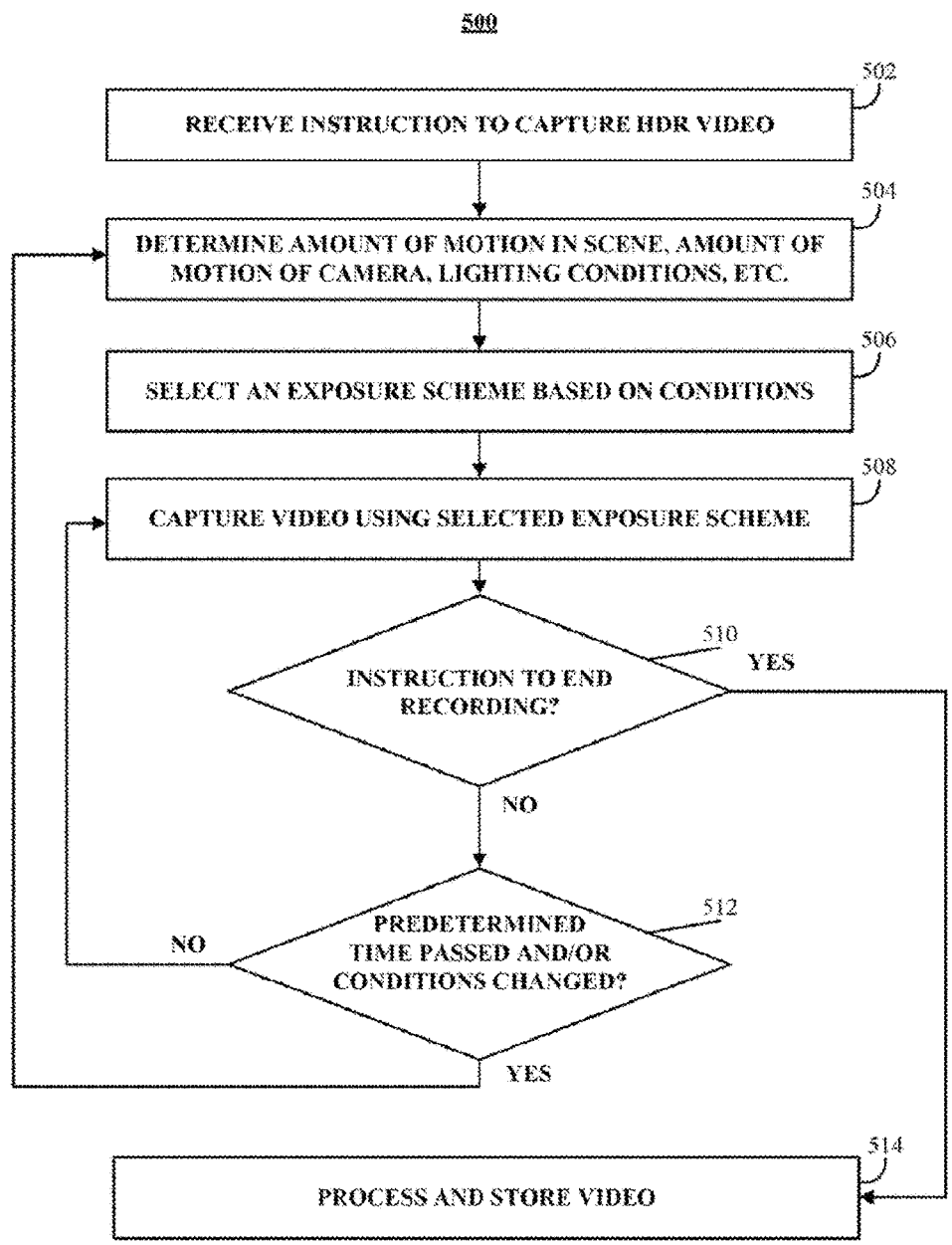
FIG. 5 shows an example of a process for capturing high dynamic range video in accordance with some embodiments of the disclosed subject matter.

FIG. 5 shows an example 500 of a process for capturing high dynamic range video in accordance with some embodiments of the disclosed subject matter. In some embodiments, process 500 can begin at 502 by receiving an instruction to capture high dynamic range video. At 504, process 500 can determine various properties of a scene to be captured in the high dynamic range video, such as an amount of camera motion and/or scene motion, lighting conditions and/or a dynamic range of the scene, etc. Any suitable technique or techniques can be used to determine such properties. For example, one or more sample images can be captured of the scene, and the sample image or images can be analyzed to determine properties of the scene.

At 506, process 500 can select an exposure scheme to use based on one or more properties of the scene, image sensor, and/or any other suitable properties. In some embodiments, process 500 can use any suitable properties to select an exposure scheme, such as brightness of the scene (e.g., irradiance of light from the scene), scene/camera motion, and image sensor parameters (e.g., read-noise level, bit-depth, full-well capacity, read-out speed of the camera, whether the camera reads out image data destructively or non-destructively, and/or any other suitable image sensor parameters). For example, if the scene is relatively evenly illuminated (e.g., has a relatively low dynamic range on the order of <$10^3$), process 500 can select to capture video using a low dynamic range scheme (e.g., single exposures). As another example, if the scene has a moderate dynamic range (e.g., some portions of the scene would not be properly exposed using an LDR scheme, such as a dynamic range on the order of $10^3$ or $10^4$) and a relatively high amount of scene and/or camera motion (e.g., on the order of greater than 2 pixels per millisecond of motion), process 500 can select a high dynamic range scheme that captures images for which motion can be compensated for can be used. In a more particular example, an exposure bracketing scheme that captures a series of short exposures of equal length. As yet another example, if the scene has a relatively high dynamic range (e.g., greater than $10^4$), or has a moderate dynamic range but a relatively low amount of scene and/or camera motion (e.g., on the order of less than 2 pixels per millisecond of motion), video can be captured using the mechanisms described herein for capturing high dynamic range images. In some embodiments, a number of frames per second at which the video is captured can be based on the selected exposure scheme and/or the specifications of the camera being used to capture the video. For example, low dynamic range video can be captured at thirty frames per second, and high dynamic range video can be captured at fifteen frames per second (e.g., because each frame of video involves capturing multiple images with different exposure times).

In some embodiments, process 500 can determine a growth rate G for an exposure bracketing scheme to be used in capturing a next frame or frames of high dynamic range video (e.g., frame K of HDR video) of high dynamic range video based on the relationship:

$$G_K = 1 + ((1 - \hat{I}_{k-1})(1 - \hat{M}_{k-1})), \tag{20}$$

where $\hat{I}_{k-1}$ can represent a normalized median intensity in of the previous frame or frames (e.g., frame K−1 of HDR video), $\hat{M}_{k-1}$ can represent a normalized mean motion between the two previous frames (e.g., frames K−1 and K−2 of HDR video). The intensity and motion information can be generated based on a representative frame from frames captured for generating the frame of HDR video. For example, if nine frames ($f_1$ to $f_9$) are captured in accordance with Fibonacci exposure bracketing, a single frame of those nine frames can be used in determining scene intensity and/or motion. In a more particular example, a frame with a median exposure time can be used as a reference frame. As another example, the frames can be combined to form a high dynamic range image in accordance with the mechanisms described herein, and the high dynamic range image can be used as a reference frame. Additionally, in some embodiments, the growth rate can be based on a parameter s that can be based on one or more parameters of the image sensor, and can be used to vary the growth rate with respect to both $\hat{I}_{k-1}$ and $\hat{M}_{k-1}$. For example, for a high quality sensor (e.g., a sensor having low read-noise, large bit depth and/or large full-well capacity), process 500 can implemented with a relatively large value s, while for a low quality sensor (e.g., a sensor having high read-noise, shallow bit depth and/or low full-well capacity) process 500 can implemented with a relatively small value s. In some embodiments, both $\hat{I}_{k-1}$ and $\hat{M}_{k-1}$ can be normalized such that they each lie in the range of [0,1].

In some embodiments, $\hat{I}_{k-1}$ and $\hat{M}_{k-1}$ can be calculated in parallel as image data is being captured and can be used to dynamically change an exposure bracketing scheme to be used in capturing high dynamic range video.

At 508, process 500 can cause video to be captured using the selected exposure scheme. At 510, process 500 can determine whether an instruction has been received to end recording of the video. If an instruction is received to end recording ("YES" at 510), process 500 can proceed to 514 where the video can be processed and/or stored. Otherwise, if no instruction is received to end the recording ("NO" at 510), process 500 can proceed to 512.

At 512, process 500 can determine whether a predetermined amount of time has passed and/or if conditions in the scene being captured have changed. For example, in some embodiments, process 500 can cause the scene conditions to re-evaluated periodically. In a more particular example, the scene can be re-evaluated every second, every 500 milliseconds, or after any other suitable period of time. Additionally or alternatively, one or more scene conditions can be evaluated in an ongoing manner, and process 500 can determine at 512 whether the scene conditions have changed. If the predetermined amount of time has not passed and/or if the scene conditions have not changed ("NO" at 512), process 500 can return to 508 and continue capturing video using the selected exposure scheme. Otherwise, if the predetermined amount of time has passed and/or if the scene conditions have changed ("YES" at 512), process 500 can return to 504, and conditions of the scene can be determined. In some embodiments, if the scene conditions have already been determined at 512, process 500 can instead return to 506 and select a new exposure scheme.

In some embodiments, if process 500 returns to 504 and/or 506, a new sample image or images can be captured and/or previously captured images in the video can be used as a sample image or images. For example, the scene conditions can be evaluated based on a high dynamic range image captured as part of the video and/or based on frames captured during a single exposure that are later used to generate a high dynamic range image. Additionally or alternatively, any other suitable information can be used to determine conditions of the scene, such as information form an auxiliary image sensor, information from other auxiliary sensors (e.g., a light meter, an accelerometer, etc.), information provided by a user, and/or any other suitable information.

At 514, process 500 can cause the video captured at 502-512 to be processed and/or stored. In some embodiments, the video captured at 502-512 can be processed to generate high dynamic range video on the fly as the video is being captured. Additionally or alternatively, high dynamic range video can be generated after recording of the video has been ended. In some embodiments, image data captured at 502-514 that can be used to create high dynamic range video can be stored in addition to, or in lieu of a device executing process 500 processing the video to create a high dynamic range video. For example, each frame of image data captured can be stored, where the frames correspond to multiple low dynamic range frames that are used in groups to generate a single high dynamic range frame.

Figure 6:
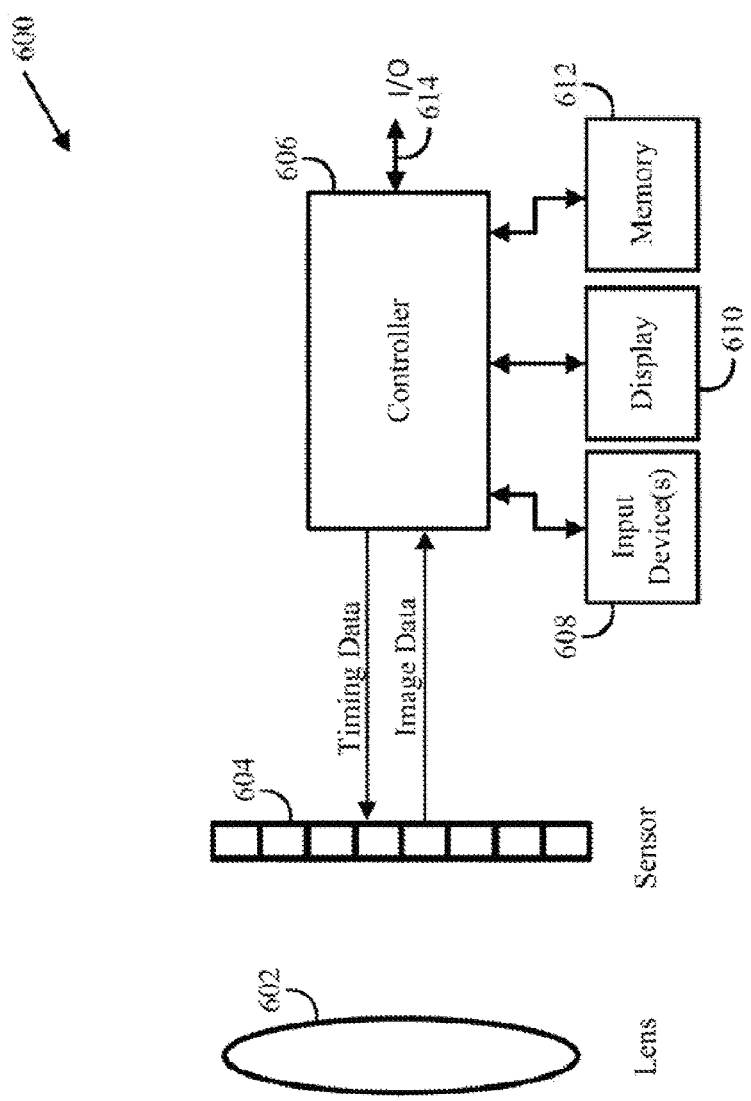
FIG. 6 shows an example of a camera system for capturing high dynamic range images in accordance with the mechanisms described herein is shown in accordance with some embodiments.

Turning to FIG. 6, an example 600 of a camera for capturing high dynamic range images in accordance with the mechanisms described herein is shown in accordance with some embodiments of the disclosed subject matter. As shown in FIG. 6, in some embodiments, camera 600 can include a lens 602 for focusing an image on an image sensor 604 (which can be the same or similar to image sensor 206). In some embodiments, camera 600 can include a controller 606 for controlling operations of camera 600. Controller 606 can be any suitable general purpose device such as a computer or special purpose device such as a client, a server, a GPU, etc., and this general or special purpose device can be implemented as a hardware processor (which can be a microprocessor, digital signal processor, a microcontroller, etc.).

In some embodiments, camera 600 can include an input device 608 (such as a shutter button, a menu button, a microphone, a touchscreen, a motion sensor, a light sensor, a focus sensor, etc., or any suitable combination thereof) for accepting input from a user and/or from the environment. In some embodiments, camera 600 can include a display 610 for displaying images, video, text, a graphical user interface, or any other suitable information. In some embodiments, camera 600 can include an I/O port 614 for allowing communication between controller 606 and other devices, such as a smartphone, a tablet computer, a laptop computer, a personal computer, a server, etc., via a communication link.

In some embodiments, camera 600 can include memory 612 for storing low dynamic range images, high dynamic range images, frames of image data for generating a high dynamic range image, low dynamic range video, high dynamic range video, audio data (e.g., audio corresponding to an image or video) or any other suitable image data. In some embodiments, memory 612 can include a storage device (e.g., a hard disk, a Blu-ray disc, a Digital Video Disk, RAM, ROM, EEPROM, etc.) for storing a computer program for controlling controller 606. For example, memory 612 can store a computer program for instructing controller 606 to capture a high dynamic range image in accordance with the disclosed subject matter, as well as any other functions of camera 600 such as capturing low dynamic range images, displaying previously captured images, and/or any other suitable functions.

In some embodiments, controller 606 can cause images to be captured by image sensor 604 by sending timing data (which can include a trigger signal) to image sensor 604. Controller 606 can cause images with any suitable exposure time to be captured by sensor 604. Any suitable technique or techniques can be used to control image capture by image sensor 604. Additionally, controller 606 can receive image data output by image sensor 604 in response to instructions to capture images (e.g., timing data). Controller 606 can, in some embodiments, perform any suitable image processing, such as generating a high dynamic range image, as well as any other suitable image processing.

Although controller 606 is shown as receiving image data from image sensor 604, the image data can be processed by any other suitable processing device or devices. For example, camera 600 can include one or more dedicated processors for performing specific image processing and/or for performing any other suitable actions. In a more particular example, camera 600 can include specialized processors for determining motion between generalized frames of image data (e.g., as described above in connection with 110), for generating a high dynamic range image from a plurality of frames of image data (e.g., as described above in connection with 112), or any other suitable processes. Additionally, camera 600 can include hardware and/or software for generating any suitable signals, such as a clock signal, a trigger signal, focus signals, and/or any other suitable signals.

In some embodiments, camera 600 can communicate with a remote device over a network using I/O port 614 and a communication link. Additionally or alternatively, camera 600 can be included as part of another device, such as a smartphone, a tablet computer, a laptop computer, a webcam, etc. Parts of camera 600 can be shared with a device with which camera 600 is integrated. For example, if camera 600 is integrated with a smartphone, controller 606 can be a processor of the smartphone and can be used to control operation of camera 600.

Camera 600 can be integrated with and/or communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as a digital camera, a smartphone, a tablet computer, a personal data assistant (PDA), a personal computer, a laptop computer, a multimedia terminal, a special purpose device, a game console, etc.

Communications over I/O port 614 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between camera 1000 and another device, such as a network link, a dial-up link, a wireless link, a hard-wired link, any other suitable communication link, or any suitable combination of such links. Camera 1000 and/or another device (e.g., a server, a personal computer, a smartphone, etc.) can enable a user to execute a computer program that allows the features of the mechanisms described herein to be used.

It should also be noted that data received through the communication link or any other communication link(s) can be received from any suitable source. In some embodiments, controller 606 can send and receive data through the communication link or any other communication link(s) using, for example, a transmitter, receiver, transmitter/receiver, transceiver, or any other suitable communication device.

Although the mechanisms described herein are generally described in relation to digital imaging, the mechanisms described herein can be adapted for use with film based image capture.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 1 and 5 can be executed or performed in any order or sequence not limited to the order and sequence shown and described in the figures. Also, some of the above steps of the processes of FIGS. 1 and 5 can be executed or performed substantially simultaneously where appropriate or in parallel to reduce latency and processing times. Furthermore, it should be noted that FIGS. 1 and 5 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

It should be noted that, as used herein, the term mechanism can encompass methods, systems, media, and any other hardware, software and firmware, or any suitable combination thereof.

Accordingly, methods, systems, and media for high dynamic range imaging are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed:

1. An image processing apparatus for high dynamic range imaging, the image processing apparatus comprising:
    at least one image sensor; and
    at least one hardware processor configured to;
        receive a time budget for capturing a plurality of images including images corresponding to first image data, second image data, and third image data;
        determine one or more properties of a scene to be captured;
        determine a first exposure time and a second exposure time based, at least in part, on the one or more properties of the scene;
        instruct the at least one image sensor to capture the first image data having the first exposure time, the second image data having the second exposure time, and the third image data having a third exposure time, wherein the third exposure time is substantially equal to a sum of the first exposure time and the second exposure time; and
        generate processed image data based, at least in part, on the first image data, the second image data and the third image data.

2. The image processing apparatus of claim 1, wherein generating the processed image data comprises generating combined image data by combining the first image data and the second image data.

3. The image processing apparatus of claim 2, wherein the at least one hardware processor is further configured to determine first estimated motion data representative of motion between the combined image data and the third image data.

4. The image processing apparatus of claim 3, wherein the at least one hardware processor is further configured to determine based, at least in part, on the first estimated motion data, second estimated motion data representative of motion between the second image data and the third image data.

5. The image processing apparatus of claim 4, wherein generating the processed image data comprises generating the processed image data using at least the first image data, the second image data, the third image data, and the second estimated motion data.

6. The image processing apparatus of claim 1, wherein the processed image data comprises a high dynamic range image.

7. The image processing apparatus of claim 1, wherein a sum of the first exposure time and the second exposure time includes a time between capturing the first image data and capturing the second image data.

8. The image processing apparatus of claim 1, wherein the first exposure time corresponds to a minimum exposure time of the at least one image sensor.

9. The image processing apparatus of claim 1, wherein the at least one hardware processor is further configured to:
  instruct the at least one image sensor to capture fourth image data having a fourth exposure time that is substantially equal to a sum of the second exposure time and the third exposure time;
  generate combined image data using the second image data and the third image data;
  determine first estimated motion data representative of motion between the combined image data and the third image data;
  determine second estimated motion data representative of motion between the third image data and the fourth image data based on the first estimated motion data; and
  generate the processed image data based, at least in part, on the fourth image data and the second estimated motion data.

10. The image processing apparatus of claim 1, wherein the one or more properties of the scene include at least one of a dynamic range of the scene, an amount of scene motion, and an amount of camera motion.

11. The image processing apparatus of claim 4, wherein determining the second estimated motion data comprises scaling the first estimated motion data based on a ratio of a sum of the second exposure time and the third exposure time to a sum of the first exposure time, the second exposure time and the third exposure time.

12. The image processing apparatus of claim 1, wherein the at least one hardware processor is further configured to:
  (a) receive an instruction to capture video;
  (b) receive the one or more properties of the scene to be captured;
  (c) set one or more exposure times to be used in capturing a frame of video based on the one or more properties of the scene;
  (d) cause image data to be captured by the at least one image sensor using the first exposure time, the second exposure time, and the third exposure time in response to determining that the one or more exposure times includes the first exposure time, the second exposure time, and the third exposure time;
  (e) cause image data to be captured by the at least one image sensor using at least a fourth exposure time in response to determining that the one or more exposure times do not include the first exposure time, the second exposure time, and the third exposure time;
  (f) determine a value of at least one of the one or more properties of the scene to be captured based on the image data captured at either (d) or (e);
  (g) repeat (b)-(f) until an instruction is received to stop capturing video;
  (h) generate the processed image data using at least a portion of the image data captured at (d); and
  (i) store the processed image data as a frame of the video.

13. An image processing apparatus for high dynamic range imaging, the image processing apparatus comprising:
  at least one image sensor; and
  at least one hardware processor configured to:
    (a) receive an instruction to capture video;
    (b) receive one or more properties of the scene to be captured;
    (c) set one or more exposure times to be used in capturing a frame of video based on the one or more properties of the scene;
    (d) instruct the at least one image sensor to capture image data having a first exposure time, a second exposure time, and a third exposure time in response to determining that the one or more exposure times includes the first exposure time, the second exposure time, and the third exposure time, wherein the third exposure time is substantially equal to a sum of the first exposure time and the second exposure time;
    (e) instruct the at least one image sensor to capture image data using at least a fourth exposure time in response to determining that the one or more exposure times do not include the first exposure time, the second exposure time, and the third exposure time;
    (f) determine a value of at least one of the one or more properties of the scene to be captured based on the image data captured at either (d) or (e);
    (g) repeat (b)-(f) until an instruction is received to stop capturing video;
    (h) generate processed image data using at least a portion of the image data captured at (d); and
    (i) store the processed image data as a frame of the video.

14. An image processing method for high dynamic range imaging, the image processing method comprising:
  receiving a time budget for capturing a plurality of images including images corresponding to first image data, second image data, and third image data;
  determining one or more properties of a scene to be captured;
  determining a first exposure time and a second exposure time based, at least in part, on the one or more properties of the scene;
  instructing at least one image sensor to capture the first image data having the first exposure time, the second image data having the second exposure time, and the third image data having a third exposure time, wherein the third exposure time is substantially equal to a sum of the first exposure time and the second exposure time; and
  generating processed image data based, at least in part, on the first image data, the second image data and the third image data.

* * * * *